United States Patent
Nürnberg (10) Patent No.: US 12,251,605 B2
(45) Date of Patent: Mar. 18, 2025

(54) BALL, IN PARTICULAR A SOCCER BALL, AND METHOD OF MANUFACTURING A BALL

(71) Applicant: adidas AG, Herzogenaurach (DE)

(72) Inventor: Hans-Peter Nürnberg, Gutenstetten (DE)

(73) Assignee: adidas AG, Herzogenaurach (DE)

( * ) Notice: Subject to any disclaimer, the term of this patent is extended or adjusted under 35 U.S.C. 154(b) by 100 days.

(21) Appl. No.: 17/465,271

(22) Filed: Sep. 2, 2021

(65) Prior Publication Data

US 2021/0394026 A1     Dec. 23, 2021

Related U.S. Application Data

(60) Continuation of application No. 16/509,027, filed on Jul. 11, 2019, now Pat. No. 11,110,324, which is a (Continued)

(30) Foreign Application Priority Data

Mar. 9, 2015 (DE) .................... 10 2015 204 151.4

(51) Int. Cl.
| | |
|---|---|
| *A63B 41/08* | (2006.01) |
| *A63B 43/00* | (2006.01) |
| *A63B 43/06* | (2006.01) |
| *A63B 45/00* | (2006.01) |
| *B33Y 10/00* | (2015.01) |
| *B33Y 80/00* | (2015.01) |

(52) U.S. Cl.
CPC .............. *A63B 45/00* (2013.01); *A63B 41/08* (2013.01); *A63B 41/085* (2013.01); *A63B 43/004* (2013.01); *A63B 43/06* (2013.01); *A63B 2225/54* (2013.01); *A63B 2225/74* (2020.08); *A63B 2243/0025* (2013.01); *B33Y 10/00* (2014.12); *B33Y 80/00* (2014.12)

(58) Field of Classification Search
CPC .................. A63B 41/08; A63B 41/085; A63B 2243/0025; A63B 2243/0037
See application file for complete search history.

(56) References Cited

U.S. PATENT DOCUMENTS

| | | | |
|---|---|---|---|
| 1,931,429 | A | 10/1933 | Buckner et al. |
| 2,182,052 | A | 12/1939 | Reach |

(Continued)

FOREIGN PATENT DOCUMENTS

| | | | |
|---|---|---|---|
| CN | 101856552 | A | 10/2010 |
| CN | 202277647 | U | 6/2012 |

(Continued)

OTHER PUBLICATIONS

"Collection of Chinese Electrical Products", China Fortune Press, Jun. 1995, Pub. No. 090.

*Primary Examiner* — Steven B Wong
(74) *Attorney, Agent, or Firm* — Sterne, Kessler, Goldstein & Fox P.L.L.C.

(57) ABSTRACT

The present invention relates to a ball, in particular a soccer ball, comprising: a shell with a plurality of panels on an outside of the shell, wherein the plurality of panels are arranged in such a way that there is a gap between two adjacent panels, and wherein the gap is at least partly filled with a filling material.

20 Claims, 5 Drawing Sheets

Related U.S. Application Data division of application No. 15/064,170, filed on Mar. 8, 2016, now Pat. No. 10,376,750.

(56) References Cited

U.S. PATENT DOCUMENTS

| | | | |
|---|---|---|---|
| 2,182,053 A | 12/1939 | Reach | |
| 2,278,292 A | 3/1942 | Voit et al. | |
| 2,579,294 A | 12/1951 | Brown | |
| 2,843,383 A | 7/1958 | Wheeler | |
| 2,879,179 A | 3/1959 | Wiley | |
| 3,506,265 A | 4/1970 | Yugi | |
| 3,887,416 A | 6/1975 | Tabbetts, Jr. | |
| 4,187,134 A | 2/1980 | Svub et al. | |
| 4,201,313 A | 5/1980 | Kirsch | |
| 4,318,544 A | 3/1982 | Brine | |
| 4,856,781 A | 8/1989 | Shishido et al. | |
| 4,875,689 A | 10/1989 | Lin | |
| 5,054,778 A | 10/1991 | Maleyko | |
| 5,310,178 A | 5/1994 | Walker et al. | |
| 5,354,053 A * | 10/1994 | Ratner | B29C 59/02 40/327 |
| 5,403,000 A | 4/1995 | Woosley | |
| 5,427,372 A * | 6/1995 | Ratner | B29D 22/02 264/293 |
| 5,541,662 A | 7/1996 | Adams et al. | |
| 5,542,662 A | 8/1996 | Kouzai et al. | |
| 5,752,890 A * | 5/1998 | Shishido | A63B 41/08 473/604 |
| 5,931,752 A | 8/1999 | Guenther et al. | |
| 6,024,661 A | 2/2000 | Guenther et al. | |
| 6,099,423 A | 8/2000 | Ou | |
| 6,123,633 A | 9/2000 | Guenther et al. | |
| 6,206,795 B1 | 3/2001 | Ou | |
| 6,283,881 B1 * | 9/2001 | Feeney | A63B 43/00 473/596 |
| 6,398,894 B1 | 6/2002 | Lee | |
| 6,406,389 B1 | 6/2002 | Feeney et al. | |
| 6,422,961 B1 | 7/2002 | Feeney | |
| 6,506,135 B2 | 1/2003 | Ou | |
| 6,663,520 B2 | 12/2003 | Chen et al. | |
| 7,179,181 B2 | 2/2007 | Ko | |
| 8,574,104 B2 | 11/2013 | Chou | |
| 8,617,011 B2 * | 12/2013 | Berggren | B29C 65/08 473/604 |
| 10,207,158 B2 * | 2/2019 | Berggren | A63B 45/02 |
| 10,376,750 B2 * | 8/2019 | Nürnberg | A63B 41/08 |
| 10,583,331 B2 | 3/2020 | Wakibayashi et al. | |
| 11,110,324 B2 * | 9/2021 | Nürnberg | A63B 41/08 |
| 2003/0008736 A1 | 1/2003 | Hung | |
| 2004/0121865 A1 | 6/2004 | Lee et al. | |
| 2004/0259670 A1 | 12/2004 | Chang | |
| 2006/0046879 A1 | 3/2006 | Kelly et al. | |
| 2006/0068951 A1 | 3/2006 | Chang | |
| 2009/0325742 A1 | 12/2009 | Krysiak | |
| 2010/0248873 A1 | 9/2010 | Cooper | |
| 2010/0255940 A1 | 10/2010 | Nuemberg et al. | |
| 2011/0118062 A1 | 5/2011 | Krysiak et al. | |
| 2011/0207564 A1 | 8/2011 | Goodall et al. | |
| 2012/0172160 A1 | 7/2012 | Marc | |
| 2012/0202627 A1 | 8/2012 | Raynak et al. | |
| 2013/0005520 A1 | 1/2013 | Chang et al. | |
| 2013/0059683 A1 | 3/2013 | Krysiak et al. | |
| 2013/0165272 A1 | 6/2013 | Cheng et al. | |
| 2013/0206329 A1 | 8/2013 | Tutmark | |
| 2013/0260927 A1 * | 10/2013 | Thurman | A63B 41/00 473/595 |
| 2014/0200103 A1 | 7/2014 | Thurman et al. | |
| 2015/0080155 A1 | 3/2015 | Bulfin | |
| 2015/0159858 A1 | 6/2015 | Lin | |
| 2015/0367928 A1 | 12/2015 | Crites | |
| 2017/0072270 A1 | 3/2017 | Shishido et al. | |
| 2019/0336830 A1 | 11/2019 | Wang | |
| 2019/0358499 A1 | 11/2019 | Nagao et al. | |

FOREIGN PATENT DOCUMENTS

| | | | |
|---|---|---|---|
| CN | 202410020 U | | 9/2012 |
| CN | 203060714 U * | | 7/2013 |
| EP | 1 080 745 B2 | | 3/2001 |
| JP | H03-92183 | | 4/1991 |
| JP | H05-293415 A | | 11/1993 |
| JP | 2014-193346 A | | 10/2004 |
| WO | WO-2015111097 A1 * | 7/2015 | A63B 41/00 |

\* cited by examiner

BALL, IN PARTICULAR A SOCCER BALL, AND METHOD OF MANUFACTURING A BALL

CROSS-REFERENCE TO RELATED APPLICATION

This application is a continuation of U.S. patent application Ser. No. 16/509,027, filed Jul. 11, 2019, which is a divisional of U.S. patent application Ser. No. 15/064,170, filed Mar. 8, 2016, which are each incorporated herein in their entireties by reference thereto.

BACKGROUND OF THE INVENTION

Field of the Invention

The present invention relates to a ball, in particular a soccer ball, and a method of manufacturing such a ball.

Background Art

Balls, in particular balls for ball sports such as soccer, are usually sewn together from either single pieces of leather or synthetic leather. Balls may also be made with panels manufactured mostly from plastic that are glued on a bladder or on a carcass arranged onto a bladder for reinforcement. The latter kind of balls are also called laminated balls.

A sewn ball is manufactured from a plurality of pieces of leather or synthetic leather, the edges of which are folded inwardly and are sewn together by a needle. By corresponding choice of geometry of the pieces of leather or synthetic leather, an approximately spherical shape is provided by the sewing together. For reinforcement, fabric is usually glued on the backside of the pieces of leather or synthetic leather. A bladder of, for example, rubber providing the necessary airtightness is mostly inserted into the hand-sewn ball. The bladder also comprises a valve for inflating the ball. Between the bladder and the pieces of leather or synthetic leather, a carcass made of fabric or of one or more circumferential threads can be arranged for reinforcement and for protection of the bladder.

For such a sewn-together ball, the edges of the pieces of leather or synthetic leather are folded against the inside and thus are sewn with adjacent, i.e. adjoining pieces of leather or synthetic leather. In this way, a seam in the form of a groove is formed on the outside of the ball between adjacent pieces of leather or synthetic leather. Such a seam generally comprises a width at the top (i.e., at the side turning away from the center of the ball) of approximately 2.5 mm and a depth of approximately 2.0 mm.

It has been proven that the seams of sewn-together balls positively affect the aerodynamic properties by reducing the drag and accordingly allowing further flight distances. As a cause therefore, small turbulences on the surface of the flying ball are considered. Moreover, the seams contribute positively to the gripping properties of the ball, i.e., the ball can be gripped and controlled more easily.

Because the ball has a three-dimensional shape it, however, cannot be sewn by a machine, but has to be sewn by hand. The disadvantage is that such hand-sewn balls are subject to big fluctuations in production, which on the one hand can affect the quality and on the other hand imply variations in weight, size, spherical shape, flight, and gripping properties. Another disadvantage of hand-sewn balls is the considerable time of their manufacturing.

These disadvantages are partly overcome with laminated balls as the panels do not have to be sewn by hand for these balls. The usual fluctuations in production for hand-sewn balls are thus found in laminated balls to a lesser extent. Moreover, a laminated ball may at least partly be manufactured by corresponding machines. As a result, and by the elimination of sewing by hand, laminated balls can essentially be manufactured more quickly.

However, laminated balls have worse flight and gripping properties as the groove between the different panels comprises a lower depth (usually approximately 1 mm). Furthermore, there are no, or at best limited, possibilities for conventional manufacturing methods of laminated balls to influence the geometry (e.g., depth, width, cross-sectional profile, etc.) and the surface properties (e.g., static friction, haptics, roughness, etc.) of this groove.

U.S. Pat. No. 6,398,894 B1 shows a method of manufacturing a basketball which comprises among other things the following steps of: (a) supplying a sheet of rubber material; (b) folding, compressing and cutting the rubber material to make the rubber material into a bladder; (c) mounting a valve in the bladder; (d) inflating the bladder with air and curing the bladder; wrapping at least one thread on the inflated bladder; (f) gluing the rubber arches on the surface of the lagged layer; (g) making a groove at each junction between adjacent rubber sheets; (h) bonding a thinner and narrower strip than the rubber sheets at each junction of adjacent rubber sheets; (i) heating and curing the relatively large multiple rubber sheets together with the strips in a mold having multiple protruding ribs defined therein to make a basketball, whereby the basketball possesses multiple, relatively concave depressions having two slanting walls defined therein.

U.S. Pat. No. 3,887,416 relates to a method of manufacturing a soccer ball covered with leather. The soccer ball is made by taking a bladder that has been wound with nylon cord and is covered with a layer of rubber, all of which is conventional, and covering it with several rubber segments, including strips at the seams, built up areas adjacent to the seams and a shaped element at each end.

U.S. Pat. No. 5,541,662 relates to a sports ball and a corresponding method of manufacturing. An inflatable tube is inserted into a top layer formed by a thin rubber pocket manufactured from a material which does not allow a solution of a bonding agent to penetrate through the top layer and an inorganic lubricant is arranged between the tube and the top layer.

EP 1 080 745 B2 relates to a laminated ball with a bladder and a plurality of pieces of leather arranged thereon, wherein the pieces of leather are bonded together at the discontinuities. The pieces of leather are directly bonded together so that there are no gaps between the pieces of leather when applying adjacent pieces of leather onto the bladder.

U.S. Pat. No. 8,574,104 relates to an inflatable sports ball structure and a manufacturing method thereof. The inflatable sports ball structure comprises an inner bladder, a reinforced carcass, and an exterior material layer. The reinforced carcass covers the surface of the inner bladder, and has a thread wound layer. Part of the thread wound layer is embedded in the reinforced carcass and provides a constricting force towards the inner bladder, and a small remaining part of the thread wound layer may be exposed on the outer surface of the reinforced carcass.

The primary object of the present invention is therefore to provide a ball, in particular a soccer ball, which on the one hand is manufactured relatively quickly, easily, and cost-effectively, and on the other hand, comprises very good flight and gripping properties approaching those of a hand-sewn ball, but without the usual quality fluctuations for hand-sewn balls. In addition, the flight and gripping properties of the ball should be adjustable individually.

BRIEF SUMMARY OF THE INVENTION

According to some embodiments, the above mentioned problem is solved by a ball, in particular a soccer ball, comprising a shell with a plurality of panels on the outside of the shell, wherein the panels are arranged in such a way that there is at least one gap between at least two adjacent panels, and wherein the at least one gap is at least partly filled with a filling material.

According to some embodiments, the ball thus comprises, in part, at least one gap between two panels. A gap according to some embodiments is understood to mean the panels do not touch in the area of the gap and a free space is formed between the respective panels. If the gap was not filled with a filling material according to some embodiments, the shell on which the panels are arranged would be visible through the gap. However according to some embodiments, two panels may form a gap in one area and touch each other in another area.

The ball according to some embodiments may be manufactured relatively quickly, easily, and cost-effectively as the panels are, for instance, glued on an appropriate shell (a bladder or a bladder reinforced with a carcass). This can also be done automatically by means of an appropriate machine. At the same time, a gap is formed between at least two panels, which is filled with filling material. Thus, the filled gap imitates a seam of a hand-sewn ball and affects positively the aerodynamic properties of the ball. The filling material is defined as insertable into the respective gap. Therefore, certain aerodynamic properties of the manufactured ball can be affected and determined very specifically. A height and/or width of the respective gap can be determined individually.

On the one hand, the geometry (e.g., depth, width, cross-sectional profile, curvatures, etc.) and the surface properties (e.g., static friction, haptics, roughness, etc.) of the filled gap may be selectively influenced by the quantity of the filling material and on the other hand by the quality of the filling material. For example, a particularly non-slip filling material may be used to improve the gripping properties of the ball.

A depth of the filled gap is at least 1 mm according to some embodiments, at least 1.5 mm according to some embodiments, and at least 2 mm according to some embodiments. The quantity of the filling material can be affected in such a way that the desirable minimum depth of the filled gap is maintained.

Moreover, the gap of the ball according to some embodiments may be filled automatically by means of a machine to reduce the fluctuations in production (and therefore the fluctuations regarding aerodynamics and haptics) between different balls to a minimum. Unlike hand-sewn balls, the "seam" (i.e., the filled gap) therefore always comprises the same cross section for any ball.

In contrast to conventional laminated balls, on the one hand the fluctuations in production are further reduced and on the other hand the geometry and surface quality of the "seam" may be set specifically in order to obtain still better flight and gripping properties. For example, a much wider "seam" may be obtained than it is possible for conventional laminated balls where the adjacent panels contact each other.

The filling material fills the gap in such a way that the outside of the shell is completely covered inside the gap. Thus, the underlying shell may be protected and a penetration of water is prevented. Unlike a hand-sewn ball, a ball according to some embodiments does not soak up with water.

The filling material may be a cured filling material being liquid before the curing. Liquid filling material may be processed easily and fills the gap very well as it fits to the form of the gap and flows into it, so to speak. As a result, the ball becomes especially waterproof.

The filling material may comprise polyurethane or silicone. These materials are easy to process, comprise advantageous surface properties—in particular a high static friction, and provide a high level of waterproofness. In particular, the material properties of polyurethane, for instance the viscosity, are particularly adjustable. Polyurethane comprises also a high affinity to the surrounding material, in particular to the material of the panels and of the shell. Alternatively, other materials can also be used as filling material, for instance resin systems.

The filling material may comprise at least one lighting element. The ball is thus clearly visible for low-light conditions (e.g., in the twilight). Furthermore, an individualization of the manufactured ball may be achieved by a certain color selection of the lighting elements. For example, the lighting elements may thus be chosen in certain club colors. As lighting elements, LEDs, Micro-LEDs, or OLEDs may be, for example, embedded into the filling material. The filling material may further be a phosphorescent or chemiluminescent material lighting particularly in the dark. A business model may also be that different balls with different embedded lighting elements may be for sale. Hence, it is possible for customers to purchase lighting balls in certain colors.

A display, from which information may be read, may further be embedded into the filling material. For example, such information may be an indication regarding measured shooting speeds, impact forces, flying heights, or playing times. Sensors for measuring such an indication may be arranged inside of the ball. Alternatively, it is conceivable that information can be inputted by a display arranged in the filling material, for instance by a touch-screen.

The filling material may also generally be formed as a display. Hence, it is possible that the filling material changes its color depending on the measured information. Thus, it is conceivable that the filling material lights in different colors depending on measured shooting speeds or shooting forces. Thus, the filling material may light in a first color for a first shooting force range, in a second color for a second shooting force range and in a third color for a third shooting force range.

The filling material may comprise at least one electronic element. For example, the electronic element may be an RFID or NFC tag by which information can be read about the ball.

The filling material may fill about 50% or more of the cross-sectional area of the gap. In this way the gap is well closed and protected against penetrating water. On the other hand, the unfilled part of the cross section of the gap is still deep enough in order to achieve good flight and gripping properties.

It is advantageous to fill the gap with filling material in such a way that the filling material extends into an area between chamfered surfaces of the panels. The height of the filling material is preferably higher than the height of lateral edges of the panels and lower than the total height of the panels. Each of the chamfered surfaces extends between the lateral edges of the panels and the outer surfaces of the panels. It is particularly advantageous if the height of the filling material is only slightly higher than the height of the lateral edges of the panels. Instead of chamfered, the surfaces may also comprise a convex or concave shape.

The height of the filling material is preferably constant along a longitudinal axis of the gap being parallel to the surface of the shell.

At least one panel of the plurality of panels may comprise a pseudo seam extending over at least a part of an outer surface of the panel. A pseudo seam is a groove on a panel giving the appearance of a joint of two panels. Pseudo seams may influence positively the aerodynamics and haptics of the ball by an appropriate choice of their depth.

The at least one pseudo seam may be filled with the filling material. In this way, there is no identifiable difference from the outside between the gap and the pseudo seam, which is advantageous for the look, aerodynamics, and haptics of the ball.

The mentioned minimum depth of at least 1 mm, at least 1.5 mm, or at least 2 mm applies to both the filled gap and the at least one pseudo seam.

The shell may be a bladder or a carcass arranged onto a bladder. A bladder provides the necessary airtightness of the ball and a carcass stabilizes the bladder and protects it against external shocks.

Some embodiments also relate to a method of manufacturing a ball, in particular a soccer ball, comprising the steps of providing a shell, providing a plurality of panels, arranging the plurality of panels on the shell so that there is at least one gap between at least two adjacent panels, and filling at least partly the at least one gap with a filling material.

According to some embodiments, at least two panels are arranged in such a way that there is a gap between them. A gap according to some embodiments is understood to mean the panels do not touch in the area of the gap and a free space is formed between the respective panels. If the gap was not filled with a filling material according to some embodiments, the shell on which the panels are arranged would be visible through the gap. However according to some embodiments, two panels may form a gap in one area and touch each other in another area.

The method according to some embodiments enables a relatively quick, easy, and cost-effective manufacture of the ball where the panels are, for instance, glued on an appropriate shell (a bladder or a bladder reinforced with a carcass). This can also be done automatically by means of an appropriate machine. At the same time, a gap is formed between at least two panels, which is filled with filling material. Thus, the filled gap imitates a seam of a hand-sewn ball and influences positively the aerodynamic properties of the ball.

The geometry (e.g., depth, width, cross-sectional profile, curvatures, etc.) and the surface properties (e.g., static friction, haptics, roughness, etc.) of the filled gap may be selectively influenced on the one hand by the quantity of the filling material and on the other hand by the quality of the filling material. For example, a particularly non-slip filling material may be used to improve the gripping properties of the ball.

Moreover, the method according to some embodiments enables the automatic filling of the gap by means of a machine to reduce the fluctuations in production (and therefore the fluctuations regarding aerodynamics and haptics) between different balls to a minimum. Unlike hand-sewn balls, the "seam" (i.e., the filled gap) therefore always comprises the same cross section for any ball. Moreover, the gaps may be created in a defined way. A filling of the gaps with filling material may also be achieved selectively and individually.

In contrast to conventional manufacturing methods of laminated balls, on the one hand the fluctuations in production are further reduced, and on the other hand, the geometry and surface quality of the "seam" may be set specifically in order to obtain still better flight and gripping properties. For example, a much wider "seam" may be obtained than is possible for conventional laminated balls where the adjacent panels contact each other.

The step of filling may be carried out in such a way that the filling material fills the gap in such a way that the outside of the shell is completely covered inside the gap. Thus, the underlying shell may be protected and a penetration of water is prevented. Unlike a hand-sewn ball, a ball according to the present invention does not soak up with water.

The filling material may be liquid and the method may further comprise the step of curing the liquid filling material. A liquid filling material may be processed easily and fills the gap very well as it fits to the form of the gap and flows into it so to speak. As a result, the ball becomes especially waterproof.

The filling material may be applied from the outside in order to fill the at least one gap. For example, a robot may be used, which enables an especially precise filling of the gap.

The filling material may be applied by a three-dimensional application technique. A three-dimensional application technique is understood to mean a method wherein an application apparatus moves in space around a workpiece, in this case a ball. Alternatively, it is also possible that the ball is moved around a fixed application apparatus.

The method may further comprise the step of forming at least one pseudo seam onto at least one panel which extends at least over a part of one outer surface of the panel. A pseudo seam is a groove on a panel that gives the appearance of being a joint of two panels. Pseudo seams may influence positively the aerodynamics and haptics of the ball for an appropriate choice of their depth and arrangement.

The method may further comprise the step of filling the at least one pseudo seam with the filling material. In this way, there is no identifiable difference from the outside between the gap and the pseudo seam which is advantageous for the look, aerodynamics, and haptics of the ball.

The step of filling the at least one gap with a filling material may be arranged in such a way that the filling material enters from the outside of the shell into the gap. For example, a layer of the filling material may initially be applied onto the ball and the panels may then be pressed onto the ball (e.g., in a mold) so that the filling material enters into the gap from below (i.e., from the center of the ball) and fills it.

The method may further comprise the step of arranging the plurality of panels in a mold. The use of molds allows a uniform pressure for pressing the panels against the shell and reduces fluctuations in production.

The method may further comprise the step of supplying the panels to the shell by means of the mold so that the at least one gap is formed between the at least two adjacent panels and gaps are formed between the panels and the shell. The mold may comprise recesses to receive the panels. The recesses are distanced in such a way that the panels form the gap when being applied to the shell. In this way, the width of the gap may be adjustable very precisely and fluctuations in production may be reduced.

The method may further comprise the step of injecting the filling material into the gaps or slits between the panels and the shell. The filling material may bond both adjacent panels with each other as well as the panels with the shell. Additional adhesives may be dispensed with.

The method may further comprise the steps of: arranging the plurality of panels on the shell by a robot arm and arranging the shell with the plurality of panels in a mold. Thereby, the robot arm may very exactly and precisely position the panels onto the shell before they are pressed by the mold to the shell at high pressure.

The method may further comprise the step of rotating the mold so that the filling material is essentially (i.e., within unavoidable fluctuations in production) uniformly distributed in the at least one gap. In this way, a distribution of the filling material in the gap results as uniformly as possible.

The filling material may comprise polyurethane or silicone. These materials are easy to process, comprise advantageous surface properties—in particular a high static friction, and provide a high level of waterproofness.

The shell may be a bladder or a carcass arranged onto a bladder. A bladder provides the necessary airtightness of the ball and a carcass stabilizes the bladder and protects it against external shocks.

The step of filling the at least one gap with the filling material may comprise adjusting the filling quantity per time unit to the cross-sectional area of the gap. It is therefore guaranteed that the gap is filled as uniformly as possible with the filling material. Possible fluctuations for the width of the gap are compensated.

The cross-sectional area of the gap may be determined in real time by means of an optical method. The determination of the cross-sectional area, i.e., the width of the gap in the simplest case if the thickness of the panels is assumed to be constant, by means of optical methods is relatively simple to carry out and enables an immediate adjustment of the filling quantity per unit of time.

BRIEF DESCRIPTION OF THE FIGURES

In the following detailed description, embodiments of the present invention are explained in more detail with reference to the following figures.

DETAILED DESCRIPTION OF THE INVENTION

Embodiments and variations of the present invention are described in more detail below.

Figure 1:
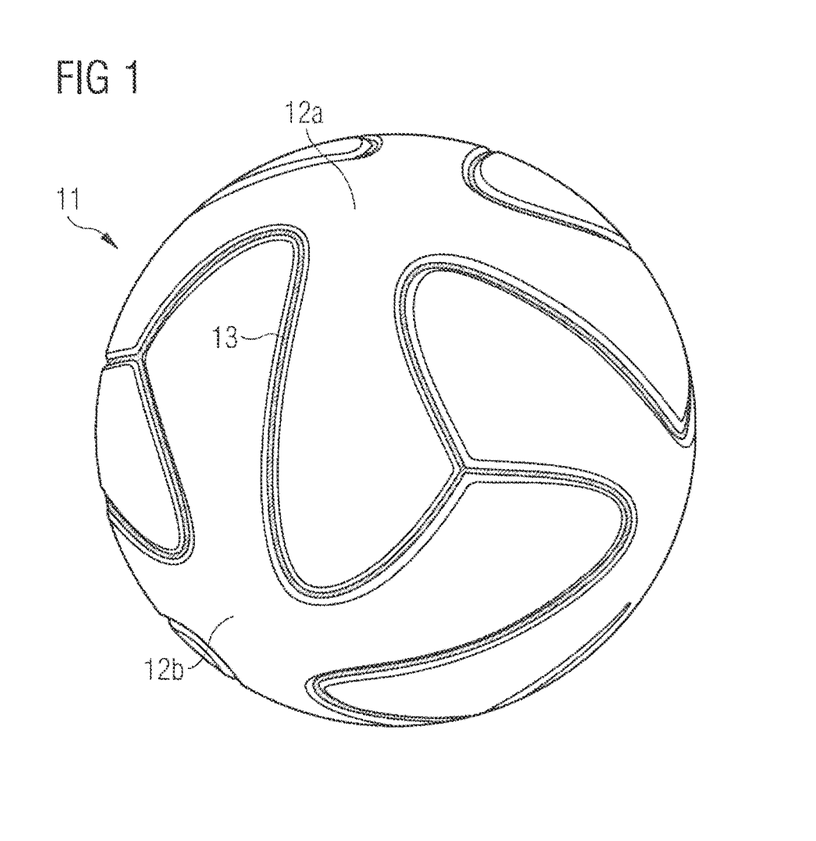
FIG. 1 shows a ball according to some embodiments.

FIG. 1 shows an embodiment of a ball 11 according to some embodiments. The ball 11 may be in particular a soccer ball. However, the present invention is not limited to a soccer ball and may be also used for balls of other sports such as basketball, volleyball, rugby, football, tennis, etc.

The ball 11 comprises a shell with a plurality of panels on the outside of the shell. The shell is not shown in FIG. 1 as it is covered with the panels. Two of the plurality of panels from FIG. 1 are referred to with the reference numerals 12a and 12b respectively. Overall, the ball 11 shown in FIG. 1 comprises six panels. In principle, a ball according to some embodiments may comprise any number of panels, but at least two. In the embodiment of FIG. 1, the ball 11 also comprises more panels which are not designated by a reference numeral. As far as within the present invention the word "plurality" is used, this means "two or more".

The shell may be a bladder which is usually used for balls in order to prevent air escaping from the ball. For example, a bladder may be manufactured from bowel, latex, or rubber. The bladder may be reinforced with a carcass to prevent a damage of the bladder through external shocks. In this case, the bladder forms, together with the carcass, the shell. The bladder may have a valve (not shown in the figures) to enable inflating of the ball 11.

For example, the panels 12a, 12b may be manufactured from leather, synthetic leather, or plastic. The panels may be glued on the shell, welded, sewn, or bonded with the shell by means of another appropriate bonding method. For example, it is possible that the shell is completely coated with an adhesive or is completely immersed into an adhesive. Afterwards, the panels 12a, 12b may be put on the shell. Alternatively, it is also possible that the panels 12a, 12b are coated with an adhesive on one side and then put on the shell with the adhesive side. For example, the adhesive may be a melt adhesive exposed for instance to infrared radiation for activation.

The panels 12a, 12b are arranged in such a way that there is at least one gap between them. In the embodiment of FIG. 1, there is a gap between the panel 12a and the panel 12b. A gap according to some embodiments is understood to mean the panels do not touch in the area of the gap and a free space is formed between the respective panels. If the gap was not filled with a filling material according to some embodiments, the shell on which the panels 12a and 12b are arranged would be visible through the gap. However according to some embodiments, two panels may form a gap in one area and touch each other in another area.

In the embodiment of FIG. 1, it is also shown that the at least one gap is filled with a filling material 13. In the embodiment of FIG. 1, the filling material 13 fills the gap in such a way that the outside of the shell is completely covered inside the gap which is why the shell is not visible in FIG. 1. The filling material 13 may be a cured filling material being liquid before the curing. For example, the filling material 13 may comprise polyurethane or silicone.

In an embodiment of the invention (not shown in FIG. 1), the filling material 13 may comprise a lighting element. For example, this may be an LED, OLED, Micro-LED or a phosphorescent or chemiluminescent material, in particular a material lighting in the dark. In principle, it is further possible to position a light source in the center of the ball and to arrange fiber optics in the filling material 13 which lead the light from the center of the ball to the outside.

The filling material 13 may comprise at least one electronic element (not shown in FIG. 1). For example, the electronic element may be an RFID or NFC tag. The RFID or NFC tag may be read out by an appropriate receiver. For example, information about the ball (e.g., model or serial number, a certificate of authenticity or certificate of origin, etc.) may be stored in the RFID or NFC tag.

In the embodiment of FIG. 1, the filling material 13 fills completely the at least one gap, i.e. the underlying shell of the ball 11 is not visible. However, in another embodiment, the filling material 13 could not completely fill the gap, i.e., the underlying shell is at least visible in a potential area of the gap.

At least one panel of the plurality of panels may comprise a pseudo seam (not shown in FIG. 1) which extends over at least a part of an outer surface of the panel. A pseudo seam is a groove-shaped recess on the outer surface of a panel 12a, 12b. Unlike a seam of a hand-sewn ball, a pseudo seam is thus not formed by the sewing of two adjacent panels, but is formed on a panel as a groove in order to imitate the seams of hand-sewn balls. The pseudo seam may be filled with the filling material 13 in the context of some embodiments. The filling material 13 may thereby almost completely fill the pseudo seam.

Figure 2:
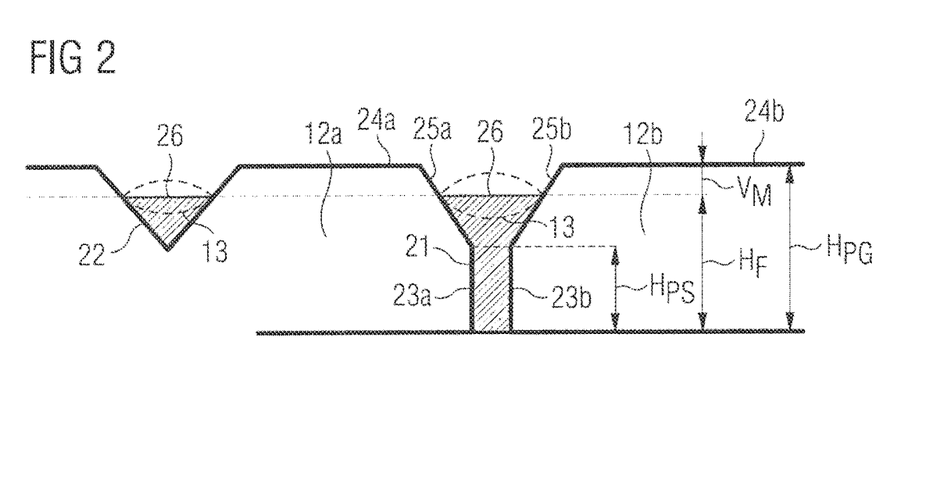
FIG. 2 shows a gap formed between two panels according to some embodiments.

FIG. 2 shows a gap 21 formed between two panels 12a and 12b in the context of some embodiments and a pseudo seam 22 in cross section. In FIG. 2, it is also shown that the pseudo seam 22 as well as the gap 21 is filled with filling material 13. In the example of FIG. 2, the pseudo seam 22 and the gap 21 are filled with filling material until the same height HF so that a minimum recess VM is given. The minimum recess VM is preferably at least 1.5 mm in order to guarantee the optimum flight properties of the ball.

Viewed from the outside the difference between the gap 21 and the pseudo seam 22 advantageously does not show. Thus, the ball 11 may be structured in almost arbitrary ways by means of pseudo seams. However, it is also conceivable that the height HF of the filling material 13 in the gap 21 and the pseudo seam 22 and thus also the minimum recess VM are different so that the gap 21 and the pseudo seam 22 may be optically distinguished viewed from the outside.

As can be seen from FIG. 2, the panels 12a, 12b comprise lateral edges of the panels 23a, 23b passing in parallel to each other as well as outer surfaces of the panels 24a, 24b. A chamfered bar 25a, 25b connects each of the lateral edges of the panels 23a, 23b with the outer surfaces 24a, 24b. By this type of forming in the shown embodiment a funnel-shaped or Y-shaped contour of the cross section of the gap 21 is pretended. It is an advantage if the gap as shown in FIG. 2 is filled with filling material 13 in such a way that the filling material 13 extends into an area between the chamfered surfaces 25a, 25b. The height HF of the filling material 13 is thereby higher than the height HPS of the lateral edges of the panels 23a, 23b and lower than the total height HPG of the panels 12a, 12b. It is particularly advantageous if the height HF of the filling material 13 is only slightly higher than the height HPS of the lateral edges of the panels 23a, 23b. It is further conceivable that a surface 26 of the filling material 13 comprises a convex or concave shape as indicated in FIG. 2 by dashed lines. By a convex or concave shape the flight properties of the manufactured ball may be influenced selectively. In this way, the haptic or optical properties can be further influenced.

A surface 26 of the filling material 13 in the pseudo seam 22 may also comprise a convex or concave curvature.

By the method according to some embodiments for manufacturing a ball, as described below, the height HF of the filling material or the minimum recess VM is adjustable individually depending on the desired flight properties.

A method for manufacturing a ball, in particular a soccer ball, according to some embodiments is explained below by means of FIGS. 3a, 3b, 3c, and 3d.

The method comprises as a first step providing a shell 31. This may be, as already explained, a bladder or a bladder reinforced with a carcass. In a next step, a plurality of panels 12a, 12b, 12c, 12d are provided. For example, the panels 12a, 12b, 12c, 12d may be punched out from respective leather, synthetic leather, or plastic sheeting. It is also conceivable that the panels 12a, 12b, 12c, 12d are manufactured using an injection molding process, deep-drawing process, or by means of a 3D-printer.

Figure 3A:
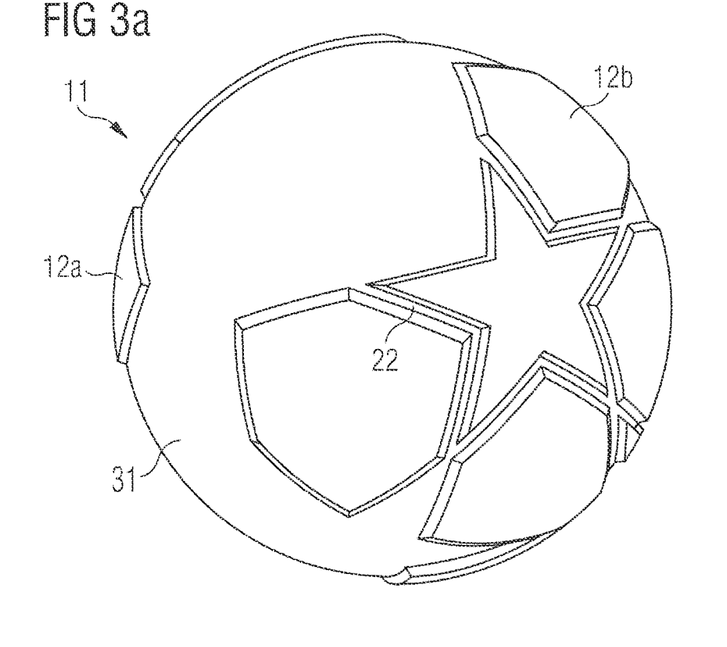
FIGS. 3a-3d show a method for manufacturing a ball according to some embodiments.
Figure 3B:
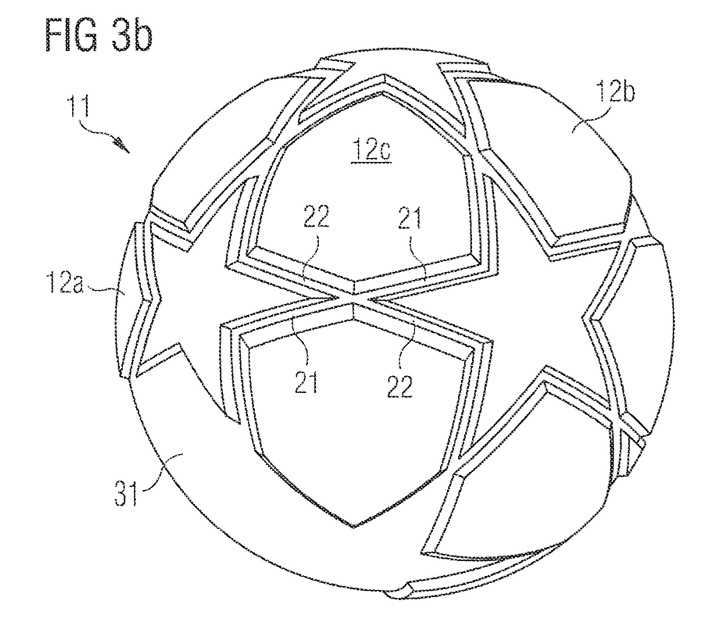
Figure 3C:
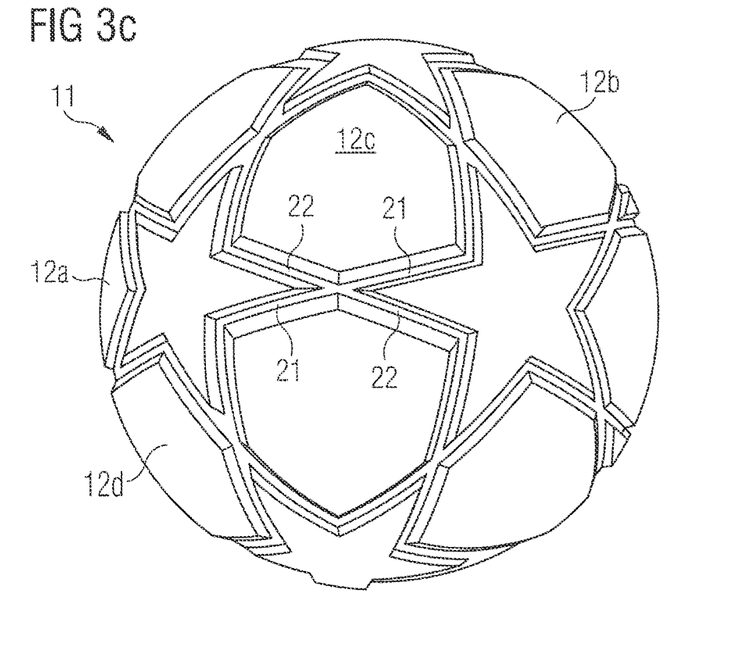

In a further step, the plurality of panels 12a, 12b, 12c, 12d is arranged on the shell so that there is at least one gap between at least two adjacent panels 12a, 12b, 12c, 12d. In FIG. 3a, two panels 12a and 12b are arranged on the shell 31. In FIG. 3b, a further panel 12c has been arranged on the shell 31 and finally in FIG. 3c a fourth panel 12d has been arranged on the shell 31 so that the shell 31 is almost completely covered except for the intentionally remaining gaps 21 between the panels. The gap is provided in such a way that adjacent panels 12a, 12b, 12c, 12d forming the gap do not touch. As explained above in the context of FIG. 1, the panels may for instance be glued on the shell.

Figure 3D:
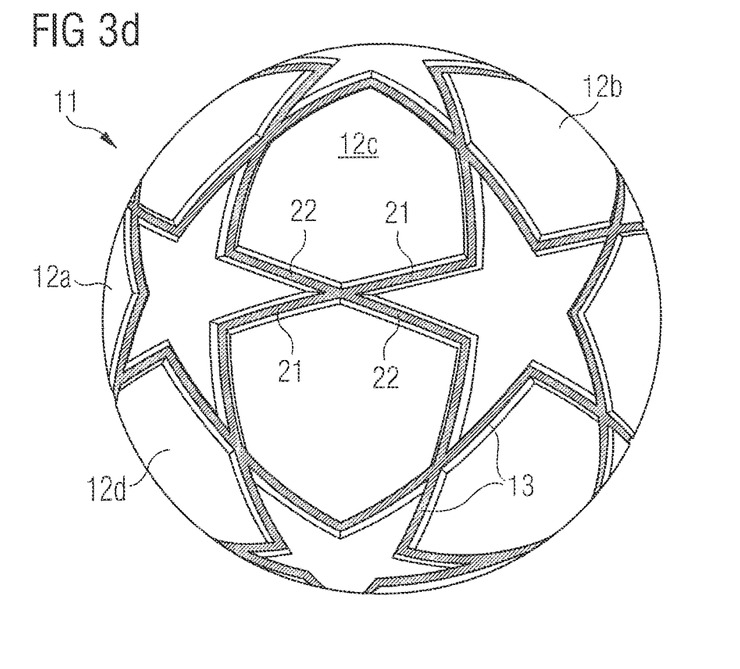

The method comprises, finally, the step of filling the at least one gap 21 with a filling material 13 as shown in FIG. 3d. The step of filling may be carried out in such a way that the filling material 13 fills the gap in such a way that the outside of the shell 31 is completely covered inside the gap 21.

As shown in FIGS. 3a, 3b, 3c, 3d, the method also comprises the step of forming a pseudo seam 22 on the panels 12a, 12b, 12c, 12d which extends over at least a part of an outer surface of the panels 12a, 12b, 12c, 12d. Instead of all panels, a pseudo seam 22 may also be formed on a subset of panels, e.g., on one panel. The pseudo seam 22 may be cut or milled in the respective panel 12a, 12b, 12c, 12d. Alternatively, the pseudo seam 22 may be formed for instance in the respective panel 12a, 12b, 12c, 12d during the injection molding. As shown in FIGS. 3a, 3b, 3c, 3d, the pseudo seam 22 comprises a groove dividing the outer surface of the respective panel 12a, 12b, 12c, 12d into portions having two different shapes. The shapes may be defined by the gap 21 and the pseudo seam 22.

As shown in FIG. 3d, the pseudo seams 22 are filled with the filling material 13 (e.g. on polyurethane or silicone base) so that viewed from the outside it may not be optically distinguished between the gaps 21 between the respective panels 12a, 12b, 12c, 12d and the pseudo seams 22 on the respective panels 12a, 12b, 12c, 12d.

If the filling material 13 is a liquid filling material 13, the method can further comprise the step of curing the liquid filling material 13. For example, the filling material 13 may be cured by means of heat or UV light.

Figure 4:
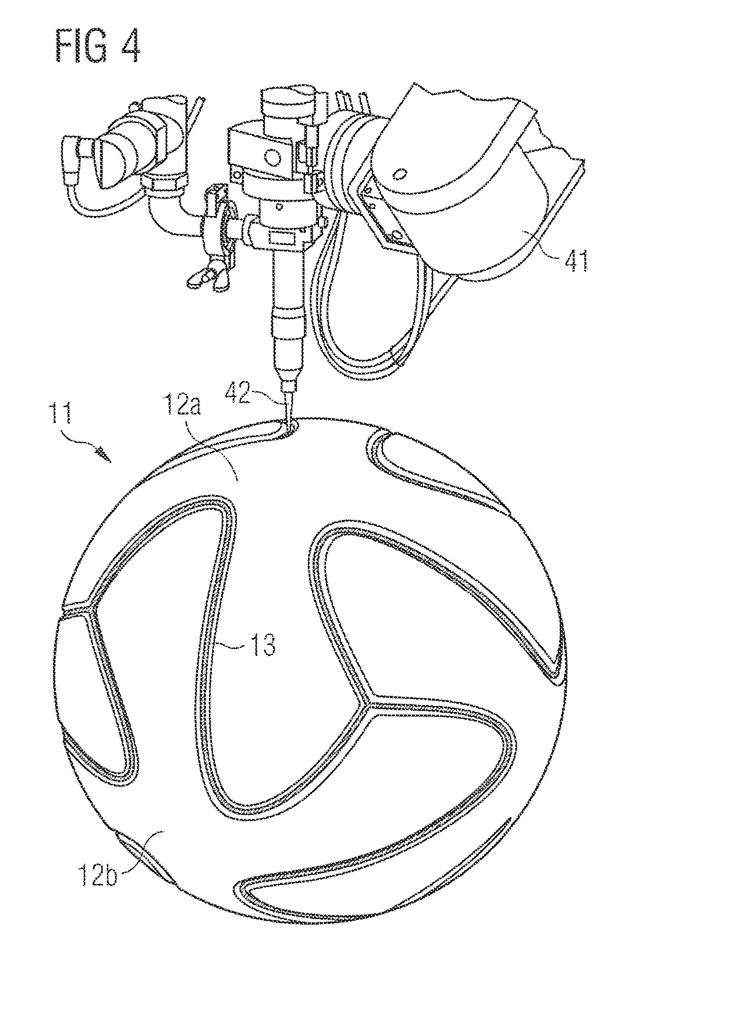
FIG. 4 shows an exemplary method step according to some embodiments, wherein the filling material is applied onto the shell from the outside by means of a robot arm.

FIG. 4 shows an exemplarily method step, wherein the filling material 13 is applied onto the shell 31 from the outside by means of a robot arm 41 in order to fill the at least one gap 21. To this end, the robot arm 41 comprises a nozzle 42 by which liquid filling material 13 is filled into the gap 21. This method is a three-dimensional application technique. The filling material 13 thus enters from the outside of the shell 31 into the gap 21 with this manufacturing method.

The robot arm 41 may comprise a sensor (not shown in FIG. 4) which measures the depth and the width of the gap 21 during the applying of the filling material 13. The quantity of the filling material 13 per unit of time to be applied may thereby at least be adjustable to the width of the gap 21 in order to obtain a gap preferably uniformly filled with filling material 13. Alternatively, the sensor may also measure the depth of the gap 21 or measure completely the geometry of the cross section. Fluctuations in the distance of the panels 12a, 12b, 12c, 12d to each other may thus be compensated. The robot arm 41 further comprises preferably a metering device by which an ejection of the filling material 13 may be controlled selectively.

An alternative manufacturing method according to some embodiments is shown in the following by means of the schematic cross-sectional view of FIG. 5 and FIG. 6. In this method, the panels 12a, 12b, 12c, 12d are inserted in a mold 51. The mold 51 is then closed so that the panels 12a, 12b, 12c, 12d are moved in the direction of a centrally fixed shell 31 (a bladder or a bladder reinforced with a carcass). Alternatively, the plurality of panels 12a, 12b, 12c, 12d may be arranged on the shell 31 by, for example, a robot arm and the shell 31 with the panels 12a, 12b, 12c, 12d may then be arranged in the mold. For both alternatives, gaps 21 remain between the panels 12a, 12b, 12c, 12d. At the same time, slits 52 remain between the panels 12a, 12b, 12c, 12d and the shell 31. By the forming of the slits 52, it is, for example, not necessary that in advance the shell 31 and/or the panels 12a, 12b, 12c, 12d are coated with an adhesive.

Figure 6:
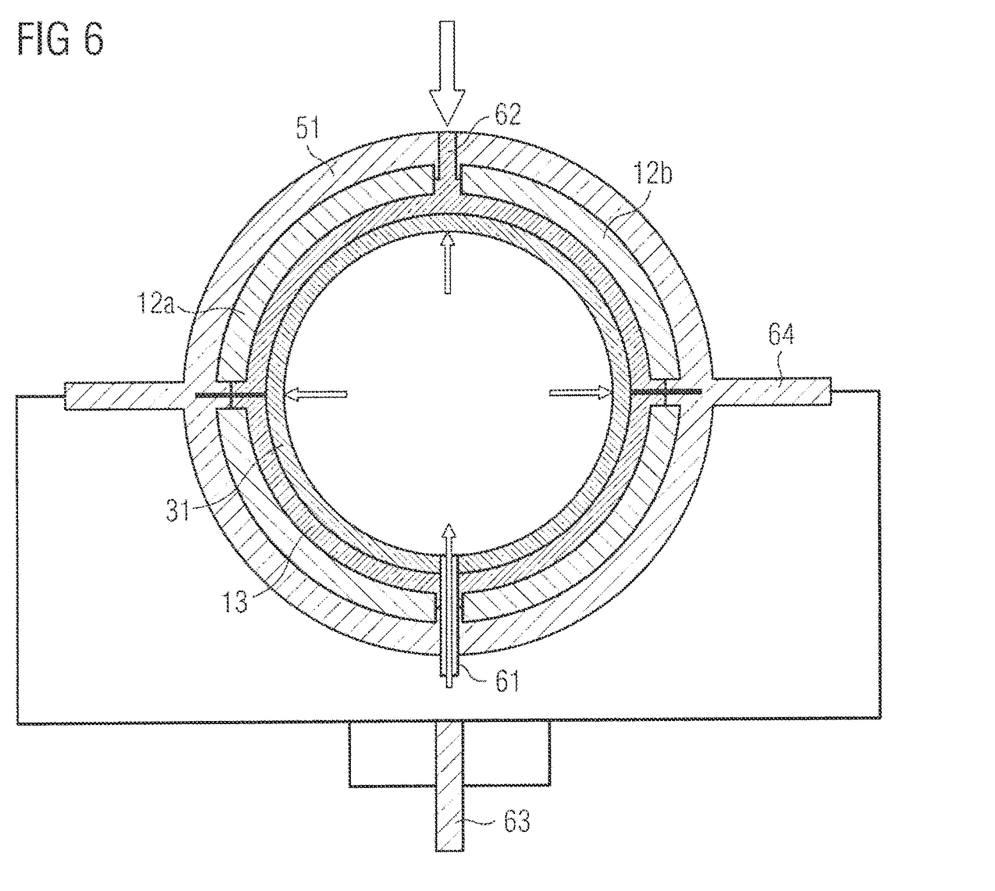
FIG. 6 shows the shell of the ball inserted in a mold together with panels according to some embodiments.

FIG. 6 shows the shell 31 arranged in the mold 51 together with the panels 12a, 12b, 12c, 12d. The shell 31 is thereby pressurized with compressed air over an inlet 61 in order to prevent a collapse of the shell 31. At the same time, the mold 51 exerts pressure to the panels 12a, 12b, 12c, 12d from the outside. By another inlet 62 in the mold 51, liquid filling material 13 (e.g. liquid polyurethane) fills in the gaps 21 between the panels 12a, 12b, 12c, 12d as well as in the slits 52 between the panels 12a, 12b, 12c, 12d and the shell 31. In this alternative embodiment, both adjacent panels 12a, 12b, 12c, 12d are bonded together and each of the panels 12a, 12b, 12c, 12d are bonded together with the shell 31 by the filling material 13.

Alternatively, the gaps 21 may also be filled without any forms by foam bead applying and then cured in a heated mold. A filling by means of foam bead applying is just one example for a possible applying variant of the filling material 13 for the case that a foamed material is used as filling material 13. The applied filling material 13 may thereby comprise different bead forms.

In the alternative embodiment of the method, the panels 12a, 12b, 12c, 12d could only form bowls with a transparent outer shell and a decorative liner which are arranged in respective molds, supplied in their exactly defined position and then back foamed by means of an appropriate polyurethane and simultaneously bonded with the carcass.

As shown in FIG. 6, the mold 51 may be suspended rotatably around a vertical axis 63 and a horizontal axis 64. The method comprises then the step of rotating the mold 51 so that the filling material 13 distributes essentially uniformly (i.e., within unavoidable fluctuations in production) in the gap 21.

Figure 5:
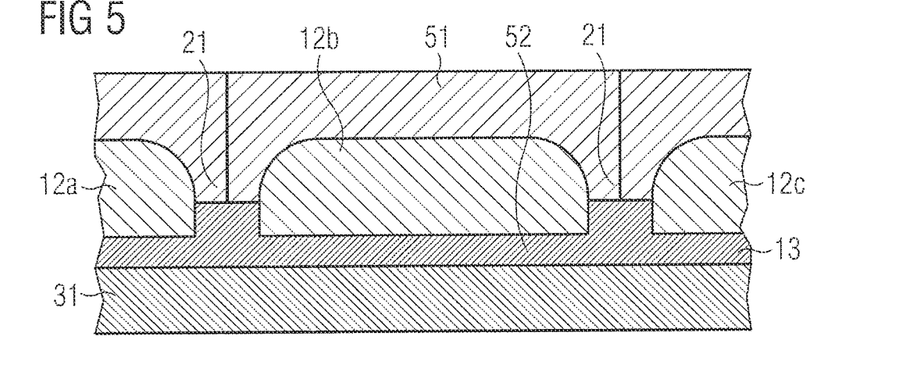
FIG. 5 shows a schematic cross-sectional view for explaining an alternative manufacturing method according to some embodiments.

It is further possible to combine the method according to FIG. 5 and FIG. 6 with the method according to FIG. 4. This makes it possible that the gaps 21 between the panels 12a, 12b, 12c, 12d and/or the slits 52 between the panels 12a, 12b, 12c, 12d and the shell 31 are filled by means of the mold 51 with the filling material 13 in accordance with the method according to FIG. 5 and FIG. 6. Additionally, the injection or applying method from the outside according to FIG. 4 may be used for filling the pseudo seams with the filling material 13.

LIST OF REFERENCE NUMERALS 11 ball
12a-12d panels
13 filling material
21 gap
22 pseudo seam
23a, 23b lateral edges of the panels
24a, 24b outer surfaces of the panels
25a, 25b chamfered surfaces
26 surface of the filled filling material
31 shell
41 robot arm
42 nozzle
51 mold
52 slits
61 air inlet
62 inlet for the filling material
63 vertical axis
64 horizontal axis

What is claimed is:

1. A ball comprising:
    a shell;
    panels disposed on an outside of the shell and arranged in such a way that there is a gap between two adjacent panels, wherein the two adjacent panels comprise a first panel and a second panel;
    a filling material partially filling the gap such that the unfilled portion of the gap has a depth of at least 1.5 mm;
    a first pseudo seam extending over an outer surface of the first panel, the first pseudo seam comprising a groove in the outer surface of the first panel and dividing the outer surface of the first panel into portions having two different shapes, the portions having the two different shapes being defined by the gap and the first pseudo seam such that each of the portions of the first panel is bordered by both the gap and the first pseudo seam; and
    a second pseudo seam extending over an outer surface of the second panel and intersecting the gap, the second pseudo seam comprising a groove in the outer surface of the second panel and dividing the outer surface of the second panel into portions having the two different shapes, the portions having the two different shapes being defined by the gap and the second pseudo seam such that each of the portions of the second panel is bordered by both the gap and the second pseudo seam;
    wherein the depth of the gap from the outer surface of one of the panels to a top surface of the filling material in the gap is different than a depth of the pseudo seam such that the pseudo seam is distinguishable from the gap.

2. The ball of claim 1, wherein a cross section of the grooves of the first pseudo seam and the second pseudo seam is V-shaped.

3. The ball of claim 1, further comprising a plurality of pseudo seams, each of the plurality of pseudo seams extending over an outer surface of one of the plurality of panels and comprising a groove, wherein the cross section of each groove is V-shaped.

4. The ball of claim 1, wherein a depth of the first pseudo seam is at least 1.5 mm.

5. The ball of claim 1, wherein the gap comprises a cross section that is different than a cross section of the grooves of the first pseudo seam and second pseudo seam.

6. The ball of claim 5, wherein the cross section of the gap is Y-shaped.

7. The ball of claim 1, wherein the grooves of the first pseudo seam and second pseudo seam comprise a laser cut surface.

8. The ball of claim 1, wherein the grooves of the first pseudo seam and second pseudo seam comprise a milled surface.

9. A ball comprising:

a shell;

panels disposed on an outside of the shell and arranged in such a way that there is a gap between two adjacent panels, wherein the gap comprises a first open space having a first cross-sectional shape and size;

a pseudo seam extending over at least a part of an outer surface of one of the panels and intersecting the gap and dividing the outer surface into portions having two different shapes, the shapes being defined by the gap and the pseudo seam, wherein the pseudo seam comprises a second open space bounded by the one of the panels and having the first cross-sectional shape and size; and a filling material partially filling the gap to a first height, wherein the first open space is bounded by the two adjacent panels and the filling material.

10. The ball of claim 9, wherein a depth of the gap from the outer surface of one of the panels to a top surface of the filling material in the gap is equal to a depth of the pseudo seam.

11. The ball of claim 9, wherein the filling material partially fills the pseudo seam to a second height, wherein the second height and the first height are equal to each other such that a depth of the gap from the outer surface of one of the panels to a top surface of the filling material in the gap is equal to a depth of the pseudo seam from the outer surface of one of the panels to a top surface of the filling material in the pseudo seam.

12. A ball comprising:

a shell;

panels disposed on an outside of the shell and arranged in such a way that there is a gap between two adjacent panels, wherein the gap comprises a first open space having a first cross-sectional shape and size;

a first pseudo seam extending over at least a part of an outer surface of a first panel of the panels and dividing the outer surface of the first panel into portions having two different shapes defined by the first pseudo seam and the gap, wherein the two different shapes defined by the first pseudo seam and the gap include a first shape and a second shape;

a second pseudo seam extending over at least a part of an outer surface of a second panel of the panels and dividing the outer surface of the second panel into portions having two different shapes defined by the second pseudo seam and the gap, wherein the two different shapes defined by the second pseudo seam and the gap include the first shape and the second shape; and a filling material partially filling the gap to a first height, wherein the first open space is bounded by the first panel, the second panel, and the filling material;

wherein the first pseudo seam and the second pseudo seam intersect the gap, and wherein the first pseudo seam and the second pseudo seam each comprise a respective second open space bounded by one of the panels and having the first cross-sectional shape and size.

13. The ball of claim 12, wherein a depth of the first pseudo seam is equal to a depth of the second pseudo seam.

14. The ball of claim 12, wherein a depth of the first pseudo seam and a depth of the second pseudo seam are at least 1.5 millimeters.

15. The ball of claim 12, wherein a depth of the first pseudo seam and a depth of the second pseudo seam are at least 2 millimeters.

16. The ball of claim 12, wherein the gap is partially filled with the filling material such that a depth of the gap from an outer surface of the two adjacent panels to a top surface of the filling material is equal to a depth of the first pseudo seam and a depth of the second pseudo seam.

17. The ball of claim 16, wherein the top surface of the filling material comprises a convex curvature.

18. The ball of claim 16, wherein the top surface of the filling material comprises a concave curvature.

19. The ball of claim 12, wherein the first panel comprises multiple instances of the first shape and wherein the second panel comprises multiple instances of the first shape.

20. The ball of claim 9, wherein the pseudo seam is optically indistinguishable from the gap when viewed from outside the ball.

* * * * *